US009563343B2

(12) United States Patent
Rains, Jr. et al.

(10) Patent No.: US 9,563,343 B2
(45) Date of Patent: Feb. 7, 2017

(54) LIGHTING PRODUCT CATALOG APPLICATION WITH EMBEDDED LINKAGE TO LIGHTING DESIGN TOOL

(71) Applicant: ABL IP HOLDING LLC, Conyers, GA (US)

(72) Inventors: Jack C. Rains, Jr., Herndon, VA (US); Januk Aggarwal, Tysons Corner, VA (US); David P. Ramer, Reston, VA (US)

(73) Assignee: ABL IP Holding LLC, Conyers, GA (US)

( * ) Notice: Subject to any disclaimer, the term of this patent is extended or adjusted under 35 U.S.C. 154(b) by 337 days.

(21) Appl. No.: 14/290,276

(22) Filed: May 29, 2014

(65) Prior Publication Data

US 2015/0346980 A1    Dec. 3, 2015

(51) Int. Cl.
*G06F 3/048*    (2013.01)
*G06F 3/0484*   (2013.01)
*G06F 3/0482*   (2013.01)
*G06Q 30/06*    (2012.01)

(52) U.S. Cl.
CPC ......... *G06F 3/04847* (2013.01); *G06F 3/0482* (2013.01); *G06F 3/04842* (2013.01); *G06Q 30/0641* (2013.01)

(58) Field of Classification Search
CPC  G06F 3/04847; G06F 3/0482; G06F 3/04842; G06Q 30/0641
USPC ....................................................... 715/771
See application file for complete search history.

(56) References Cited

U.S. PATENT DOCUMENTS

| | | | |
|---|---|---|---|
| 7,062,722 B1 * | 6/2006 | Carlin | G06T 15/10 715/781 |
| 7,925,996 B2 * | 4/2011 | Hofmeister | G06F 3/0488 715/701 |
| RE44,404 E * | 8/2013 | Golinveaux | 169/17 |
| 8,989,440 B2 * | 3/2015 | Klusza | G06K 9/00624 382/103 |

(Continued)

OTHER PUBLICATIONS

"Developing with Vuforia", Vuforia Developer Portal, Apr. 22, 2014 (http://developer.vuforia.com/resources/dev-guide/getting-started).

(Continued)

*Primary Examiner* — David Phantana Angkool
(74) *Attorney, Agent, or Firm* — Ratner Prestia; Keith E. George

(57) ABSTRACT

An application running on a mobile device presents information about a lighting product, for example, selected from a catalog on a graphical user interface via one or more elements (e.g. a touchscreen) of the mobile device and captures an identification of the selected product. The user interface includes a user selectable indication of a lighting design tool, e.g. a button, icon or other link to the tool. User selection of the tool indicator initiates access to the lighting design tool; and the application passes the identification of the selected product to the lighting design tool. The lighting design tool processes the identification of the selected product and an output of the lighting design tool is presented based in part on photometric information about the selected product automatically retrieved by and populated to the lighting design tool without further manual input to obtain the photometric information about the selected product.

17 Claims, 10 Drawing Sheets

(56) References Cited

U.S. PATENT DOCUMENTS

| | | | |
|---|---|---|---|
| 9,214,137 B2 * | 12/2015 | Bala | G06F 3/147 |
| 9,286,727 B2 * | 3/2016 | Kim | G06T 19/006 |
| 9,292,162 B2 * | 3/2016 | Topakas | G06F 3/04815 |
| 9,368,101 B1 * | 6/2016 | Meyer | G10K 15/08 |
| 2008/0262805 A1 * | 10/2008 | Lin | G06Q 30/0603 703/2 |
| 2012/0095828 A1 * | 4/2012 | Evankovich | G06Q 10/00 705/14.49 |
| 2012/0231424 A1 * | 9/2012 | Calman | G09B 25/04 434/72 |
| 2013/0024793 A1 * | 1/2013 | Rosenblatt | G06K 9/228 715/764 |
| 2014/0325370 A1 * | 10/2014 | Rosenblatt | G06K 9/228 715/738 |
| 2015/0346980 A1 * | 12/2015 | Rains, Jr. | G06F 3/04847 715/771 |

OTHER PUBLICATIONS

"Visual Interior Tool™", Visual Interior Tool, Apr. 22, 2014 (http://www.visual-3d.com/tools/interior/).

"10.2 Design Tools", Visual 2012 Help, Apr. 22, 2014 (http://www.visual-3d.com/help/visual_2012_help.htm).

* cited by examiner

LIGHTING PRODUCT CATALOG APPLICATION WITH EMBEDDED LINKAGE TO LIGHTING DESIGN TOOL

TECHNICAL FIELD

The present examples relate to techniques and services to help lighting design specialists and other individuals to select a particular lighting product, e.g. for use within a particular space, and to retrieve detailed information related to installation or operation of the lighting product within the space. The detailed lighting information service is based on automatically capturing a lighting product identifier within a lighting product catalog application and automatically transferring the lighting product identifier to a lighting design tool.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use. Lighting design, however, can be very complex and require specialized expertise along with highly customized tools.

Even a single supplier or manufacturer may offer thousands of lighting products for a multitude of lighting applications and/or in a variety of aesthetic styles. For each such product, the manufacturer will have physical and operational data about the product that may need to be considered and processed when a person is deciding whether or how to use each particular product for that person's desired lighting project.

Lighting solutions, particularly in commercial and/or high-end residential spaces, are typically designed by representatives of lighting manufacturers. Such lighting professionals design lighting solutions to meet the needs of current or would-be occupants of the space, but with a particular lighting manufacturer's product line in mind. As such, the current or would-be occupant might have multiple alternative solutions from which to select with the assistance of a lighting designer. Even if initially chosen by a customer, the designer often needs to process information about a product to design an installation to meet building codes and/or customer expectations, e.g. number and arrangement of selected fixtures to achieve desired light levels. Furthermore, lighting installers and/or service technicians are often tasked with ensuring complex lighting solutions are properly installed and functioning optimally, which requires access to product specifications.

However, identifying a particular lighting product, visualizing the particular lighting product within a space, and retrieving detailed information related to the lighting product and the lighting product within the space has remained difficult and often requires transitioning between multiple applications with manual data entry that increases the time involved as well as the potential for error.

SUMMARY

What is needed, therefore, is an automated process for capturing a lighting product identifier from within a lighting product catalog application and transferring the captured identifier automatically to a lighting design tool so that detailed information related to the lighting product can be retrieved. The techniques and services discussed below leverage the processing power of existing computing devices, such as a smartphone or tablet, to seamlessly capture and transfer the necessary identifier so that a lighting design specialist or other individual can retrieve detailed information related to a particular lighting product within a space without unnecessary manual data entry.

An example of an article of manufacture described in detail below includes a non-transitory machine-readable storage medium and a program embodied in the medium. Execution of the program, in the example, by a programmable device supports functions, including functions to provide a graphical user interface for access to a catalog of information about lighting products listed in the catalog and, responsive to a user selection of a lighting product from the catalog, present via the graphical user interface at least some information related to the selected lighting product. The presentation includes a user selectable indication of a photometric lighting design tool. In the example, the functions also include functions to, responsive to a user selection of the indication of the photometric lighting design tool, automatically capture an identification of the selected lighting product, access the photometric lighting design tool and pass the identification of the selected lighting product to the photometric lighting design tool. The functions further include a function to, based on execution of the photometric lighting design tool responsive to the identification of the selected lighting product, present via the graphical user interface an output of the photometric lighting design tool based at least in part on photometric information about the selected lighting product automatically retrieved by and populated to the photometric lighting design tool without further manual input to obtain at least some of the photometric information about the selected lighting product.

An example of a method described in detail below includes the steps of receiving, via a graphical user interface of a mobile device, a user input selecting a lighting product from a catalog of information about lighting products listed in the catalog and presenting, via the graphical user interface of the mobile device, at least some information related to the selected lighting product. The presentation includes a user selectable indication of a photometric lighting design tool. The example method further includes the steps of, responsive to a user input selecting the indication of the photometric lighting design tool via the graphical user interface of the mobile device, automatically capturing an identification of the selected lighting product, accessing the photometric lighting design tool, and passing the identification of the selected lighting product to the photometric lighting design tool. The example method also includes the step of presenting, via the graphical user interface of the mobile device and based on execution of the photometric lighting design tool responsive to the identification of the selected lighting product, an output of the photometric lighting design tool based at least in part on photometric information about the selected lighting product automatically retrieved by and populated to the photometric lighting design tool without further manual input to obtain at least some of the photometric information about the selected lighting product.

A system example described in detail below includes a processor, a storage device accessible by the processor, a catalog of information about lighting products listed in the catalog, a photometric lighting design tool for designing a lighting product installation within a space and determining the photometric impact of the lighting product installation, and a program in the storage device. In that example, execution of the program by the processor configures the system to implement functions, including functions to provide a graphical user interface for access to the catalog and, responsive to a user selection of a lighting product from the catalog, present via the graphical user interface at least some information related to the selected lighting product. The presentation includes a user selectable indication of the photometric lighting design tool. The functions also include, in that example, functions to, responsive to a user selection of the indication of the photometric lighting design tool, automatically capture an identification of the selected lighting product, access the photometric lighting design tool, and pass the identification of the selected lighting product to the photometric lighting design tool. The functions further include a function to, based on execution of the photometric lighting design tool responsive to the identification of the selected lighting product, present via the graphical user interface an output of the photometric lighting design tool based at least in part on photometric information about the selected lighting product automatically retrieved by and populated to the photometric lighting design tool without further manual input to obtain at least some of the photometric information about the selected lighting product.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
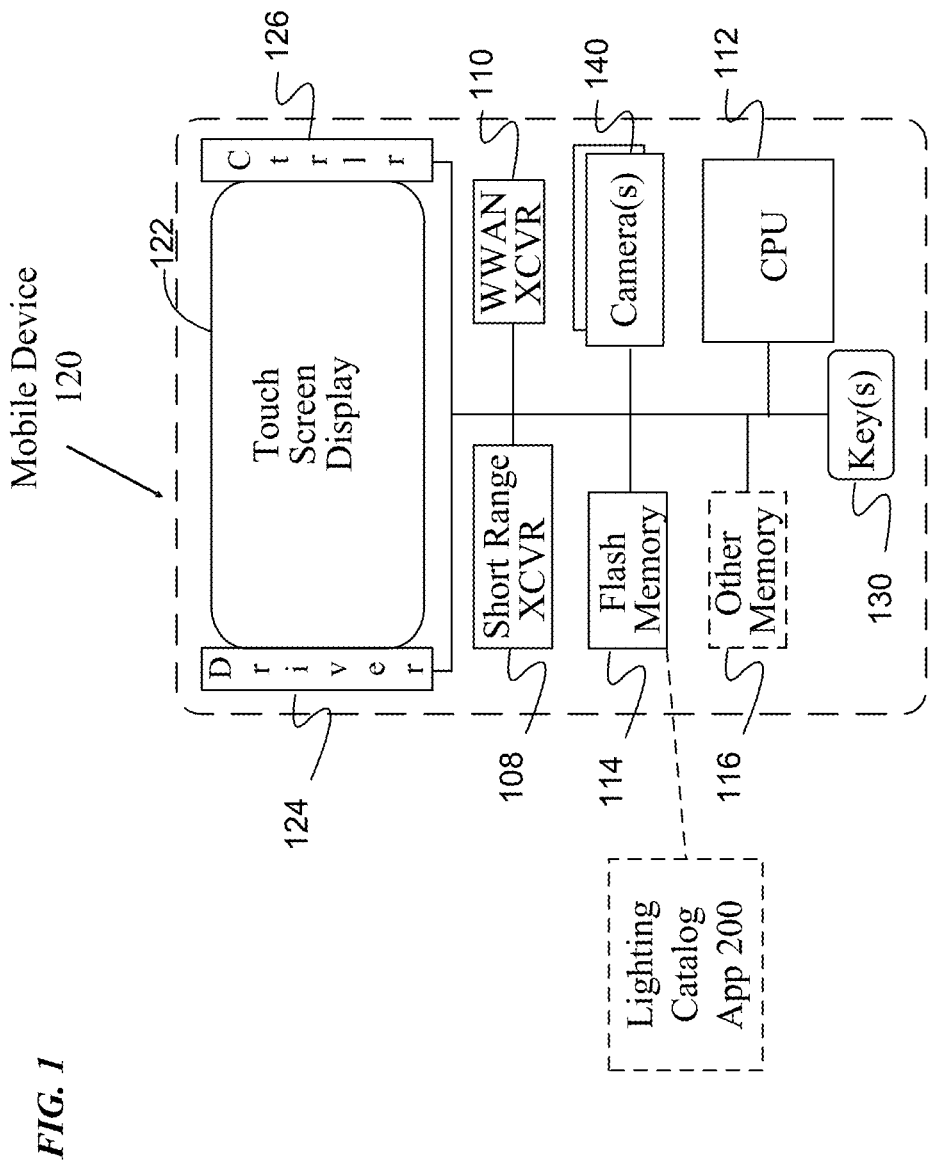
FIG. 1 is a simplified functional block diagram of an example of a mobile device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Lighting is commonplace and an everyday occurrence. Lighting design, however, is complex and highly technical, particularly in a commercial setting such as an office building, warehouse, or other similar space. A typical user of lighting in a commercial setting, for the most part, is only concerned with whether the lighting works and provides sufficient light for the task at hand. The typical user, however, is not necessarily concerned with how the lighting system was designed and/or whether the lighting is performing at an optimal level. On the other hand, lighting design and optimization is the key role of a lighting professional, such as a lighting designer, service technician, installer, other type of manufacturer representative, etc.

Proper design and optimization of lighting involves complex and highly technical calculations that historically have required highly specialized equipment and/or multiple different software applications. A lighting product catalog application allows a user, for example, to browse through a collection of lighting products and select a preferred lighting product in order to review details and specifications of that selected lighting product. The lighting product catalog application does not, however, assist the user and/or a lighting professional in designing an optimal installation of the selected lighting product within a particular space. At the same time, a photometric lighting design tool allows a lighting professional, for example, to define a particular space and design an optimal installation of the selected lighting product; but the lighting professional must manually input and/or otherwise identify the selected lighting product from within the photometric lighting design tool. As such, there is not an easy way to capture an identification of the selected lighting product from the lighting product catalog application and automatically transfer the identification to the lighting design tool.

Several of the examples improve the ability of a user to capture an identification of a lighting product selected from a lighting product catalog application and automatically transfer the selected lighting product identification from the lighting product catalog application to a lighting design tool application so that the lighting design tool application can retrieve and populate information related to the selected lighting product without further manual input from the user about the selected product.

Reference now is made in detail to the examples illustrated in the accompanying drawings and discussed below.

FIG. 1 provides a block diagram illustration of an example of a touch screen type mobile device 120, such as a smartphone or a tablet. The mobile device 120 in the example includes at least one short range transceiver (XCVR) 108 and at least one long range transceiver (WWAN XCVR) 110, for digital wireless communications, although the handset 120 may include additional digital or analog transceiver(s). The concepts discussed here encompass embodiments of the mobile device 120 utilizing any digital transceivers that conform to current or future developed digital wireless communication standards; although in other cases, only one or no transceivers may be provided.

Mobile device 120 includes a microprocessor (CPU) 112 which serves as a programmable controller for the mobile device 120, in that it controls all operations of the mobile device 120 in accord with programming that it executes, for all normal operations, and for operations involved in catalog presentations, design tool access and automatically capturing and transferring a lighting product identification under consideration here. In the example, the mobile device 120 includes flash type program memory 114, for storage of various program routines and mobile configuration settings, such as lighting catalog app 200 for providing information related to available lighting products. The mobile device 120 may also include other memory 116 for a working data processing memory. Of course, other storage devices or configurations may be added to or substituted for those in the example. The flash type program memory 114 stores firmware such as a boot routine, device driver software, an operating system, call processing software, vocoder control software, and any of a wide variety of other applications, such as lighting catalog app 200.

Hence, as outlined above, the mobile device 120 includes a processor, and programming stored in the flash memory 114 configures the processor so that the mobile device is capable of performing various desired functions, including in this case the functions involved in the techniques for capturing and transferring a lighting product identification.

Mobile device 120 may have a limited number of key(s) 130, in which example, the graphical user interface functions are implemented by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the mobile device 120 in our example includes a display 122, which the microprocessor 112 controls via a display driver 124, to present visible outputs to the device user. The mobile device 120 also includes a touch/position controller 126. The controller 126 is relatively transparent, so that the user may view the information presented on the display 122. The controller 126 senses signals from elements of the touch/position controller 126 and detects occurrence and position of each touch of the screen formed by the display 122 and controller 126. The controller 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 120. Although not shown, the mobile device 120 may also include audio output and/or input components. Mobile device 120, in our example, also includes one or more cameras 140, each for capturing images, such as an optical image depicting a space within which a selected lighting product will be installed.

The block diagram of a hardware platform of FIG. 1 represents an example of a mobile device, such as a tablet computer, smartphone or the like with a network interface to a wireless link, which may alternatively serve as a user terminal or interface device, such as for accessing a photometric lighting design tool under consideration here.

Figure 2:
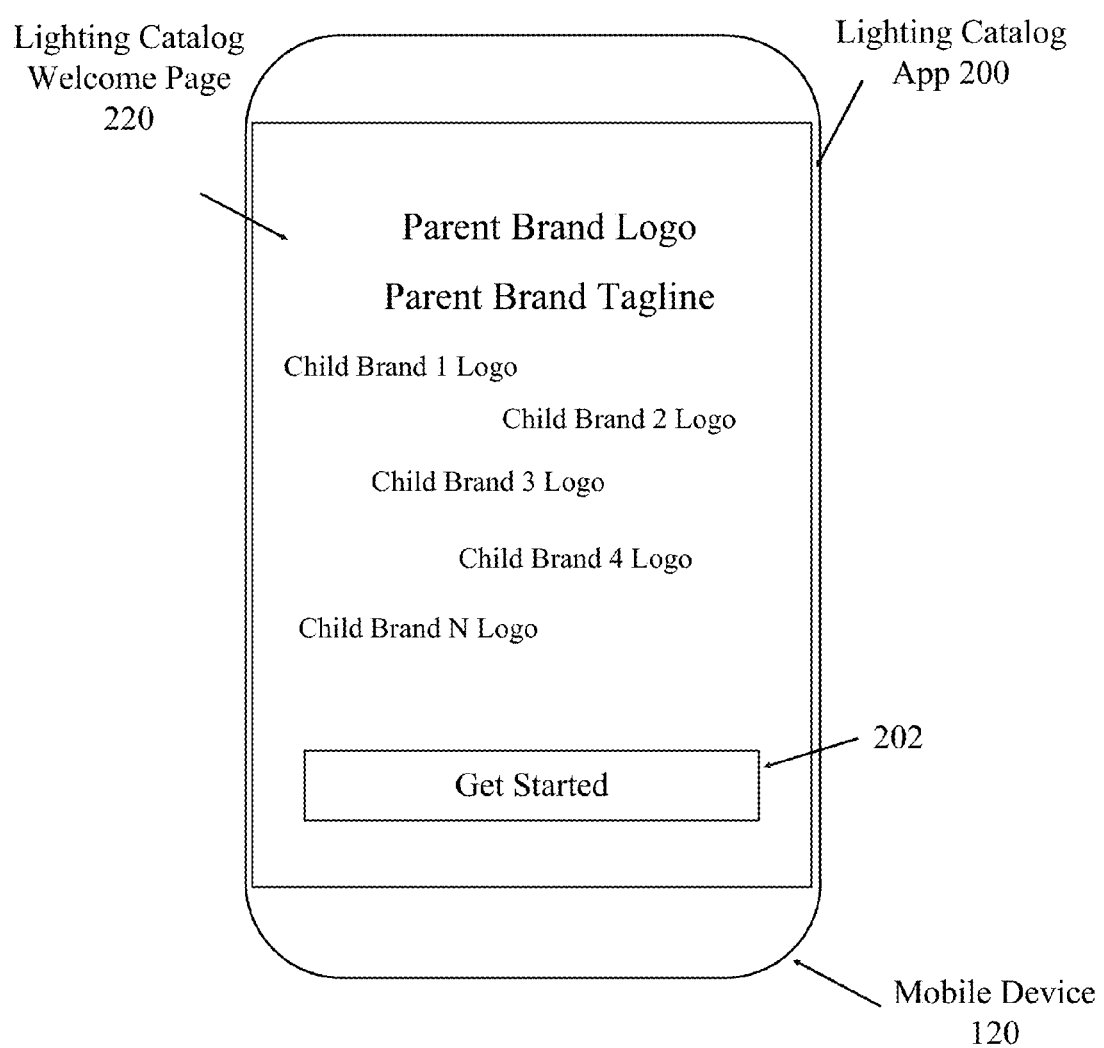
FIGS. 2 to 6 illustrate examples of user interface screens of a lighting catalog application for operation on a mobile device.

FIG. 2 illustrates an example of a user interface screen of a lighting catalog application for operation on a mobile device. Although the example of FIG. 2 depicts a lighting catalog app 200 presenting lighting products organized in a particular way, such as a parent brand and multiple child brands, this is only for simplicity; and the lighting catalog app 200 under consideration here may present information about listed lighting products organized in any number of ways. Furthermore, in the examples, the listed lighting products in the catalog are generally available for purchase. Some listed lighting products in the catalog, however, may not be available for purchase (e.g., out of stock, only available for pre-order, discontinued but included for historical and/or analytical reasons, etc.).

In one example, lighting catalog app 200 operates on mobile device 120 and initially presents a lighting catalog welcome page 220. Lighting catalog welcome page 220 includes various logos, such as a parent brand logo and multiple child brand logos, as well as a tagline of the parent brand. Although the example lighting catalog welcome page 220 of FIG. 2 is formatted in a particular way, this is only for simplicity and is not limiting in any way. In an alternate example, lighting catalog app 200 includes lighting products from various parent brands and lighting catalog welcome page 220 includes the various logos of each of the parent brands represented in the lighting catalog app 200.

In any of the examples, lighting catalog welcome page 220 includes a lighting catalog get started button 202. The lighting catalog get started button 202 initiates the process of browsing lighting products within the lighting catalog app 200. A user initiates the browsing process by selecting the lighting catalog get started button 202, for example, by user touch of the displayed button 202 on the touchscreen display 122 of mobile device 120.

Figure 3:
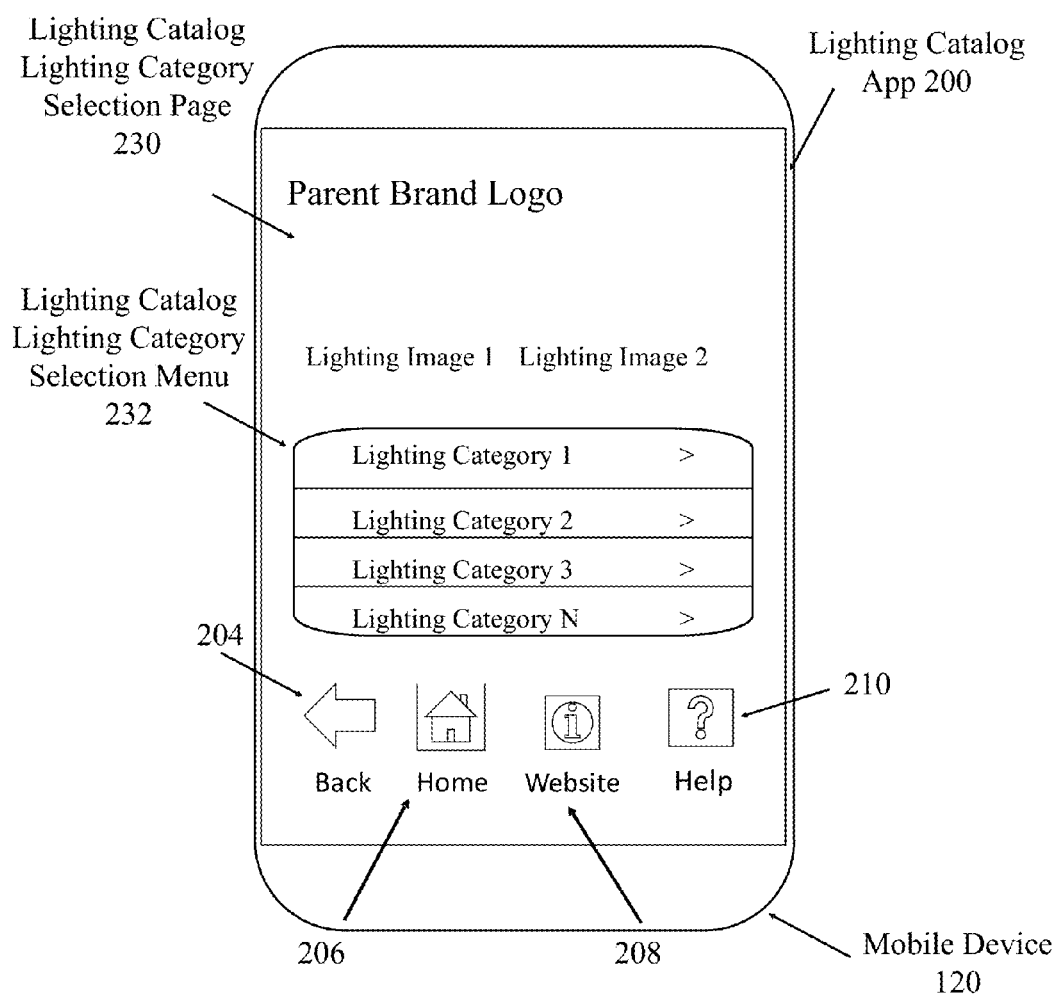

Selecting the lighting catalog get started button 202 of the lighting catalog welcome page 220 prompts the lighting catalog app 200 to present, for example, a lighting catalog lighting category selection page 230, as illustrated in FIG. 3. Again, the layout or format of the lighting catalog lighting category selection page 230 as depicted in FIG. 3 is only one example and a lighting catalog app 200 with a different structure, such as the alternate example of various parent brands, may have a different layout or format facilitating the lighting product browsing process most appropriate for the particular contents or structure.

In the example of FIG. 3, lighting catalog lighting category selection page 230 includes lighting catalog lighting category selection menu 232. Lighting category selection menu 232 contains a list of the various categories of lighting products listed within lighting catalog app 200. In an example, the various categories include outdoor, indoor, specialty, and/or lighting control. Each of the various categories as displayed within lighting category selection menu 232 is a link and/or button prompting lighting catalog app 200 to present a subsequent user interface screen for the respective product category, an example of which is described below in relation to FIG. 4.

Lighting catalog lighting category selection page 230 also includes, for example, various buttons to facilitate navigation throughout lighting catalog app 200 and/or to other features and/or functionality. For example, lighting category selection page 230 includes a back button 204, a home button 206, a website button 208 and a help button 210. The back button 204, for example, prompts lighting catalog app 200 to return to the previous screen. The home button 206, for example, prompts lighting catalog app 200 to return to the lighting catalog welcome page 220. Website button 208, for example, prompts lighting catalog app 200 to suspend or exit and causes the mobile device 120 to launch a web browser (not shown) and request a website, such as the website of the parent brand. The help button 210, for example, prompts lighting catalog app 200 to present help functionality, such as directions and/or other information relevant to the current screen of lighting catalog app 200. These various buttons may be included in other screens of lighting catalog app 200 and, although the buttons are depicted in other figures, these various buttons will not be described further below.

Furthermore, lighting category selection page 230 includes, for example, one or more logos, such as the parent brand logo, along with various images, such as lighting image 1 and lighting image 2 depicted in FIG. 3. These various images represent additional marketing and/or advertising for one or more of the listed lighting products listed in the lighting catalog. As such, the various images depict, for example, one or more of the listed lighting products appropriately deployed and/or in use.

Figure 4:
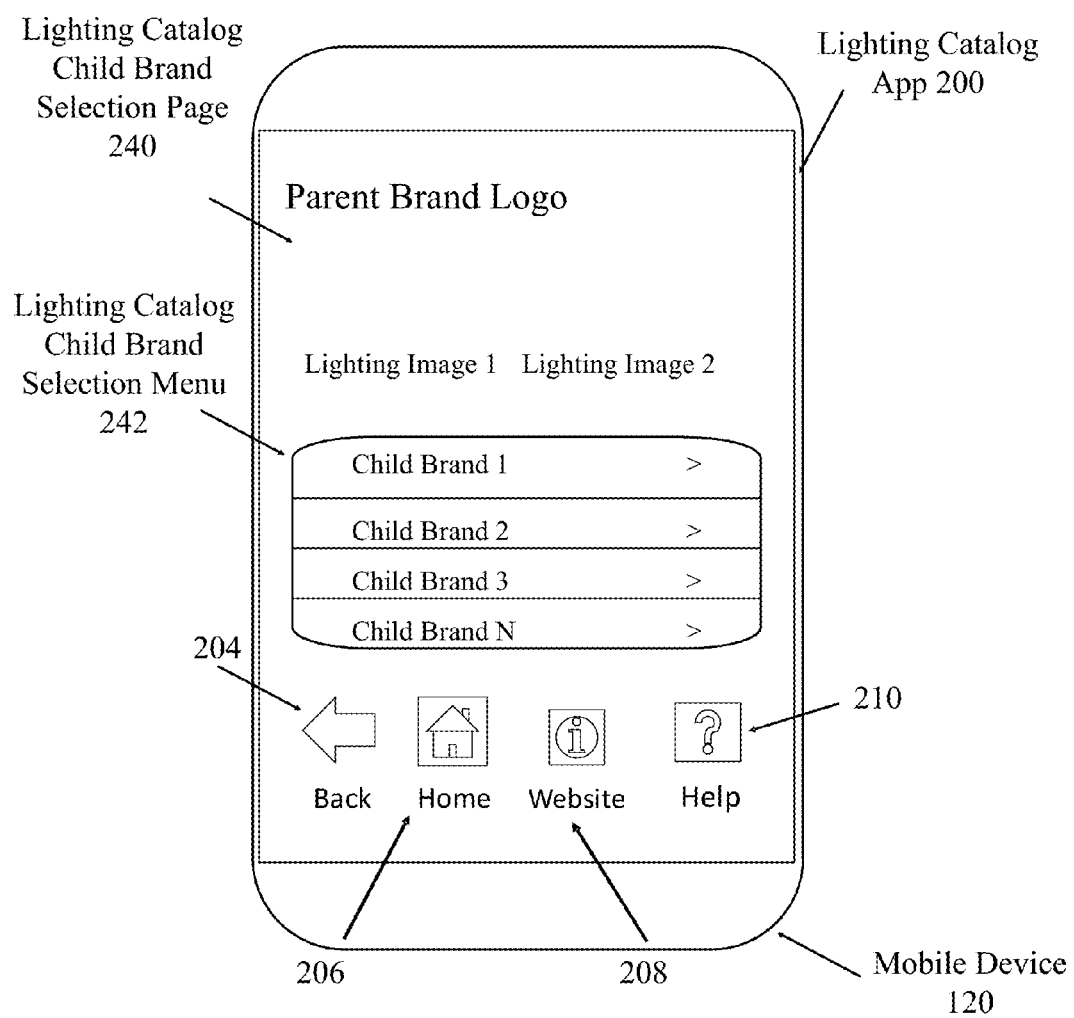

Selecting a particular lighting category from lighting catalog lighting category selection menu 232 prompts lighting catalog app 200 to present, for example, a lighting catalog child brand selection page 240, as illustrated in FIG. 4. As discussed above, the current figures assume a particular structure of lighting catalog app 200, but this is only for simplicity. As such, lighting catalog app 200 with a different structure, for example, would appropriately present different selection pages to facilitate browsing lighting catalog app 200 in order to select a particular product.

User selection of a category from page 230, e.g. selection of indoor lighting, causes the catalog app 200 to navigate to a screen such as 240 that shows child brands that offer lighting products in the selected category, e.g. that offer luminaires designed for indoor applications. Hence, as illustrated in FIG. 4, the selected lighting category from lighting category selection menu 232 includes various child brands that each provide lighting products within the selected category. Thus, lighting catalog child brand selection page 240 includes lighting catalog child brand selection menu 242. Child brand selection menu 242 includes a list of each of the child brands that provide lighting products within the selected category. As with lighting category selection menu 232, each depiction of a listed child brand is a link and/or button to a subsequent user interface screen described below in relation to FIG. 5.

Similar to lighting category selection page 230, child brand selection page 240 includes, for example, various buttons, including back button 204, home button 206, website button 208 and help button 210. Furthermore, child brand selection page 240 includes, for example, one or more logos, such as the parent brand logo, and various lighting images, such as lighting image 1 and lighting image 2.

Figure 5:
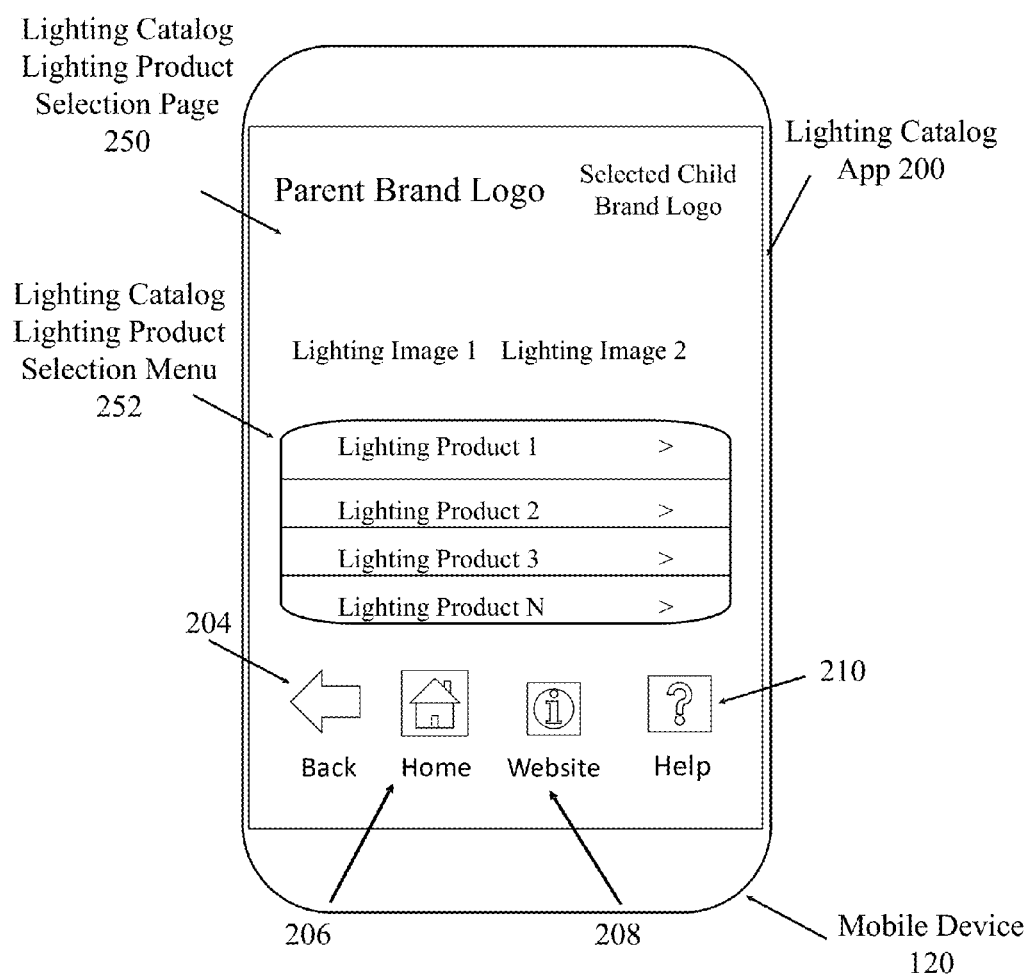

Selecting a particular child brand from child brand selection menu 242 prompts lighting catalog app 200 to present, for example, a lighting catalog lighting product selection page 250, as illustrated in FIG. 5, that relates to products in the earlier selected category by the selected child brand. Lighting catalog lighting product selection page 250, in one example, includes lighting catalog lighting product selection menu 252. Lighting product selection menu 252 includes a list of some number of lighting products available from the selected lighting product child brand within the selected lighting product category. The list may be scrollable, or the menu 252 may offer options to navigate to other similar product listing pages matching the category and brand selections. As with lighting category selection menu 232 and child brand selection menu 242, each depiction of a listed lighting product is a link and/or button to a subsequent user interface screen described below in relation to FIG. 6.

Similar to lighting category selection page 230 and child brand selection page 240, lighting product selection page 250 includes, for example, various buttons, including back button 204, home button 206, website button 208 and help button 210 as well as one or more logos, such as the parent brand logo and the selected child brand logo, and various lighting images, such as lighting image 1 and lighting image 2.

Figure 6:
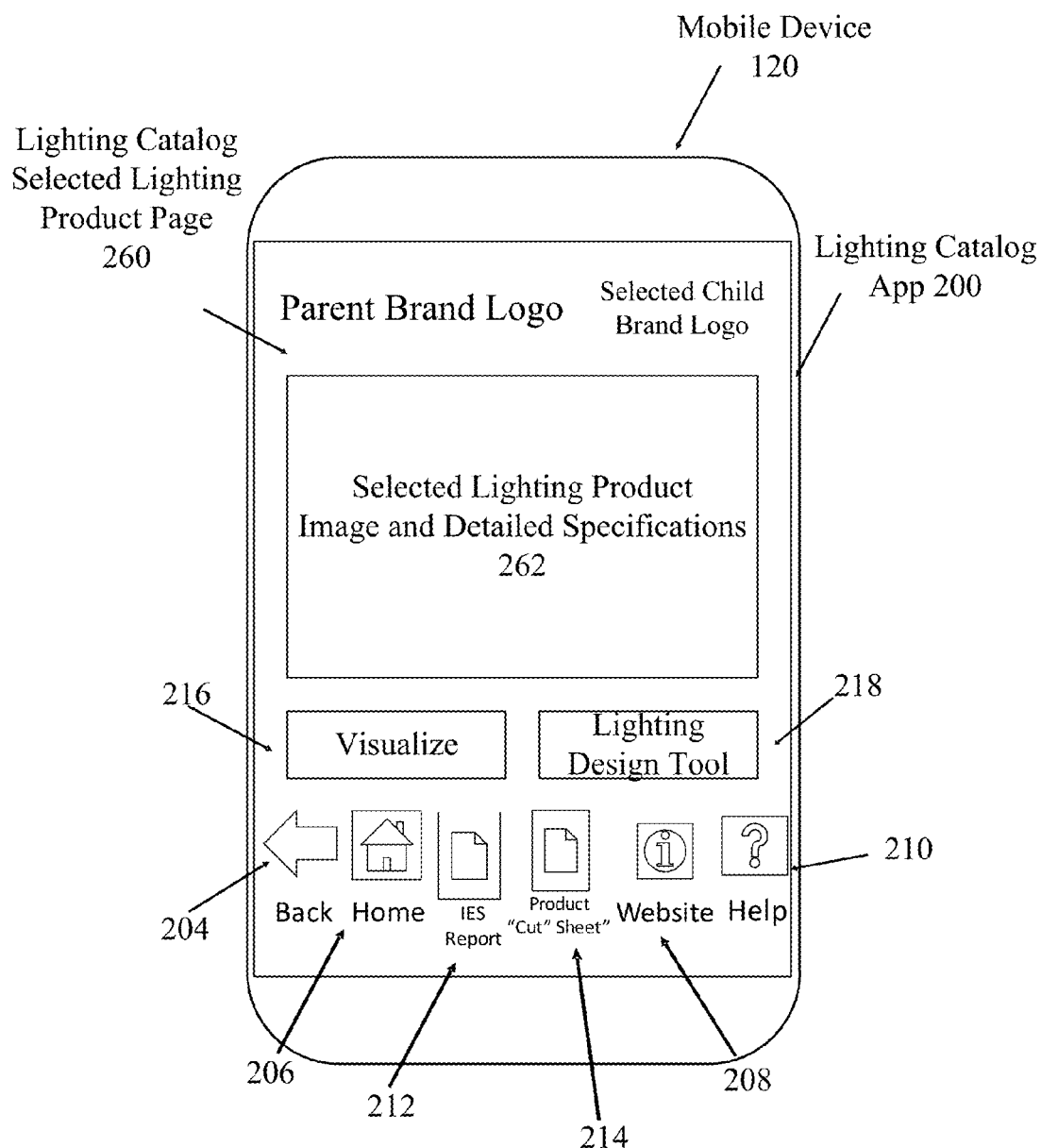

Selecting a particular lighting product from lighting product selection menu 252 prompts lighting catalog app 200 to present, for example, a lighting catalog selected lighting product page 260, as illustrated in FIG. 6. In one example, selected lighting product page 260 includes selected lighting product image and detailed specifications 262. Selected lighting product image and detailed specifications 262 is an image of the selected lighting product, a brief description, intended use and availability of the selected lighting product, and detailed specifications related to the selected lighting product. Detailed specifications related to the selected lighting product include, for example, lighting parameters, configuration, and installation options.

Selected lighting product page 260 also includes, for example, various buttons, including back button 204, home button 206, website button 208 and help button 210 as described above. However, at this point in our example, the page 260 includes additional user selectable buttons. The various buttons on page 260 also include, for example, lighting product IES report button 212, lighting product cut sheet button 214, visualize button 216 and lighting design tool button 218. User selection of the lighting product IES report button 212 prompts lighting catalog app 200 to present an IES report corresponding to the selected lighting product. The IES report provides detailed photometric performance information of the selected lighting product. User selection of the lighting product cut sheet button 214 prompts lighting catalog app 200 to present a cut sheet corresponding to the selected lighting product. The cut sheet provides greater detail regarding the selected lighting product and necessary information for ordering the selected lighting product.

User selection of the visualize button 216 prompts lighting catalog app 200 to control camera 140 to generate a live image of a space and superimpose an image of the selected lighting product over the live image of the space, as described in greater detail below in relation to FIG. 8. User selection of the lighting design tool button 218 prompts lighting catalog app 200 to capture an identification of the selected lighting product, access the lighting design tool and automatically transfer the captured identification of the selected lighting product to the lighting design tool, as described in greater detail below in relation to FIG. 7.

Figure 7:
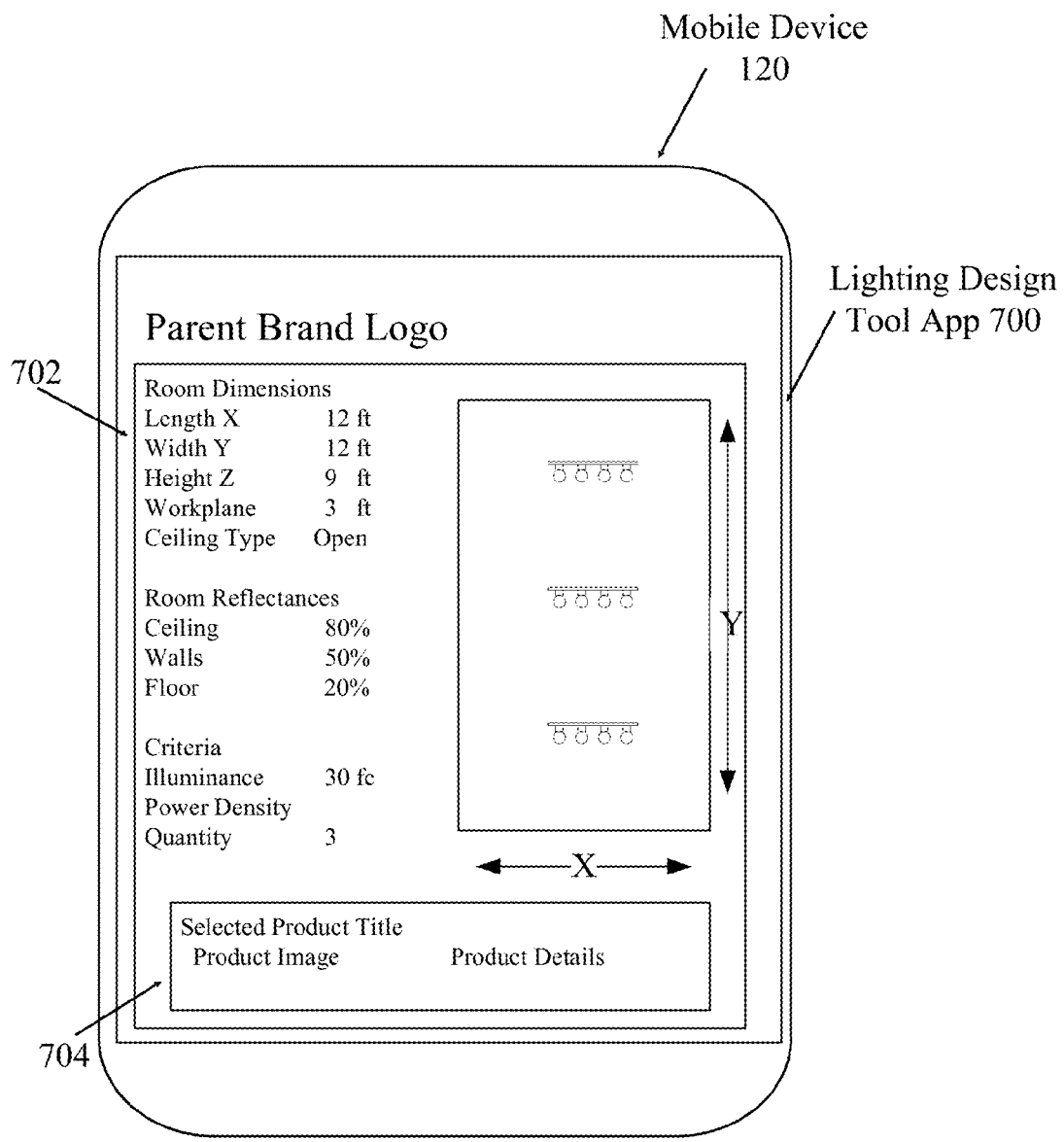
FIG. 7 illustrates an example of a user interface screen of a lighting design tool application accessed via a mobile device.

Selecting lighting design tool button 218 prompts lighting catalog app 200 to perform several functions, including accessing lighting design tool app 700, as illustrated in FIG. 7. In one example, after lighting design tool button 218 is selected and prior to accessing lighting design tool app 700, lighting catalog app 200 captures an identification of the selected lighting product. The identification of the selected lighting product is, for example, a serial number, a part number and/or a product identifier that uniquely identifies the selected lighting product. Such identification may be displayed by lighting catalog app 200, such as within selected lighting product image and detailed specifications 262, or such identification may be maintained internally and not displayed by lighting catalog app 200.

Lighting catalog app 200 maintains, for example, each of the listed lighting products as a record within a database and the corresponding identification of each lighting product is stored within a field of each corresponding record. Thus, lighting catalog app 200 captures the identification of the selected lighting product by retrieving the identification from the appropriate field within the corresponding record of the selected lighting product.

After lighting catalog app 200 captures the identification of the selected lighting product, lighting catalog app 200 prompts mobile device 120 to access lighting design tool app 700 and lighting catalog app 200 includes the captured identification with the prompt. In one example, lighting design tool app 700 is another application stored within flash memory 114. In this example, operation of lighting catalog app 200 is suspended and/or otherwise halted by mobile device 120 and operation of lighting design tool app 700 is initiated. As part of the initiation of lighting design tool app 700, the captured identification of the selected lighting product is automatically transferred and/or otherwise made available to the lighting design tool app 700.

In an alternate example, lighting design tool app 700 is a web-based application accessible via a web browser (not shown) of mobile device 120. In this alternate example, operation of lighting catalog app 200 is suspended and/or otherwise halted by mobile device 120 and operation of the web browser is initiated to access lighting design tool app 700. As part of the web browser initiation, the captured identification of the selected lighting product is automatically transferred and/or otherwise included in the communication to initially access lighting design tool app 700.

In a further alternate example, operation of lighting catalog app 200 is not suspended or otherwise halted by mobile device 120. Instead, access to lighting design tool app 700, whether stored within flash memory 114 or a web-based application, is performed within lighting catalog app 200. For example, lighting design tool app 700 is a web-based application and lighting catalog app 200 implements web browser functionality such that a web browser (not shown) of mobile device 120 is not needed to access lighting design tool app 700. Alternatively, or in addition, lighting design tool app 700 is a module or component of lighting catalog app 200.

In the examples, lighting design tool app 700 presents an output based at least in part on photometric information about the selected lighting product retrieved by and populated to lighting design tool app 700 by utilizing the captured identification of the selected lighting product automatically transferred to lighting design tool app 700 without further manual input about the selection of the lighting product.

At this point, a general understanding of the operation of lighting design tool app 700 may be helpful. Lighting design tool app 700 allows, for example, a user, such as a lighting professional, to define a space within which a lighting product is to be installed and select a lighting product for installation within the defined space. In our examples, the product selection is provided automatically via the interaction through the catalog app. Based on the defined space and the selected lighting product, lighting design tool app 700 determines an optimal layout of the selected lighting product within the defined space and provides lighting performance statistics based on that optimal layout. A user may manipulate a number of related criteria and prompt lighting design tool app 700 to adjust the optimal layout and/or otherwise influence the output presented by lighting design tool app 700.

As illustrated in FIG. 7, lighting design tool app 700 includes a layout and performance portion 702 and a selected product portion 704. The layout and performance portion 702 includes, for example, room dimensions, room reflectances, and criteria as well as a graphical depiction of the defined space and the lighting layout within the space. The selected product portion 704 includes, for example, information about the selected lighting product for which a lighting layout within the defined space is being generated.

In a traditional approach, a user of lighting design tool app 700 interacts, for example, with the selected product portion 704, which is initially empty, to select a lighting product for inclusion within the lighting installation being designed by lighting design tool app 700. That is, in the traditional approach, a user, such as the end-user of the lighting installation, would interact with a lighting catalog app or website to select a lighting product and, separately, a user, such as a lighting designer, would interact with lighting design tool app 700 to select the same lighting product. Thus, a redundant process of browsing and selecting a lighting product is performed within two different applications by potentially two different individuals.

Utilizing the lighting design tool button 218 within lighting catalog app 200, to automatically capture an identification of the selected lighting product and to automatically transfer the captured identification to the lighting design tool app 700, eliminates the redundant process of browsing and selecting the lighting product within lighting design tool 700, making the process more convenient and reducing the potential for human errors in inputting the selection of the design tool.

In our example, the product catalog app also offers a feature enabling the user to visualize a selected product in a particular space. Selecting visualize button 216 prompts lighting catalog app 200 to control camera 140 to generate a live image of a space and superimpose an image of the selected lighting product over the live image of the space, as illustrated in FIG. 8. For a renovation, the space viewed may be a room or other area where a customer would like to have a product installed. In other instances, the viewed space may be any area in which the user would like to visualize the product. Although FIG. 8 depicts a stationary image, the visualize functionality of lighting catalog app 200 allows a user of lighting catalog app 200 to change the position of mobile device 120, thus changing the position of camera 140 and the resulting live image of the space, and, as a result, view an updated image of the selected lighting product depicting a corresponding perspective of how the selected lighting product might look within the space. That is, the visualize functionality of lighting catalog app 200 allows a user to visualize how a virtual version of the lighting product might look within an actual space which may be or represents a space where the lighting product may be installed.

Figure 8:
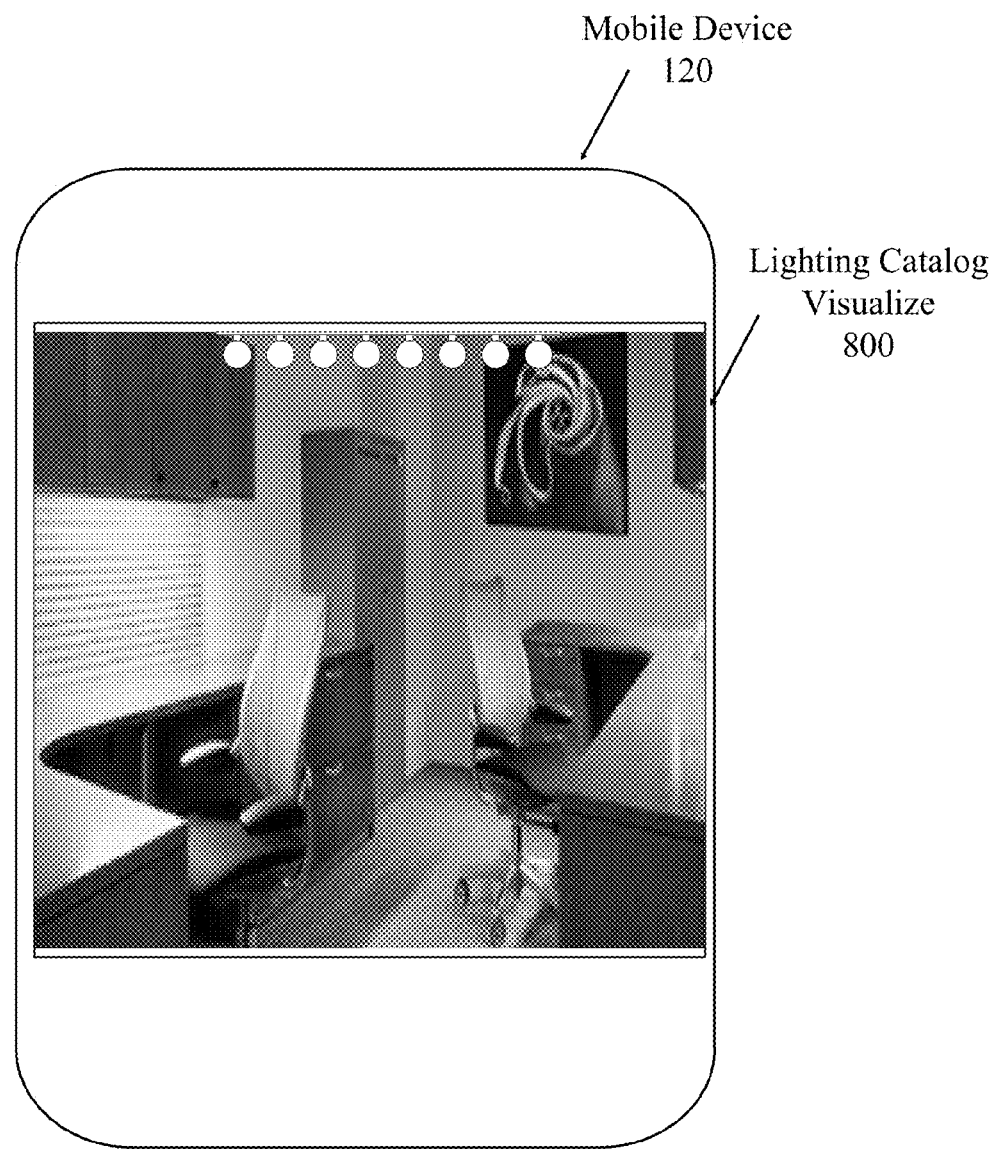
FIG. 8 illustrates an example of an additional user interface screen of the lighting catalog application depicting a selected lighting product superimposed on an image being captured by a camera of a mobile device.

In the example of FIG. 8, a virtual image of a selected lighting product is superimposed upon a live image of a room or other space within which the selected lighting product is to be installed. Although FIG. 8 depicts a single selected lighting product, multiple lighting products may be selected and depicted. The multiple lighting products are, for example, multiple instances of the same selected lighting product and/or additional selected lighting products. In a further example (not shown), the room or other space may not yet be constructed and/or otherwise finished. For example, one or more additional walls and/or other features do not yet exist. Alternatively, or in addition, one or more existing walls and/or other features are to be removed, replaced and/or repositioned. In this further example, a virtual model of the to be completed room or other space is superimposed along with the virtual image of the selected lighting product upon a live image of the existing room or other space resulting in the end-user being provided with the ability to visualize the selected lighting product within the to be completed room or other space.

Figure 9:
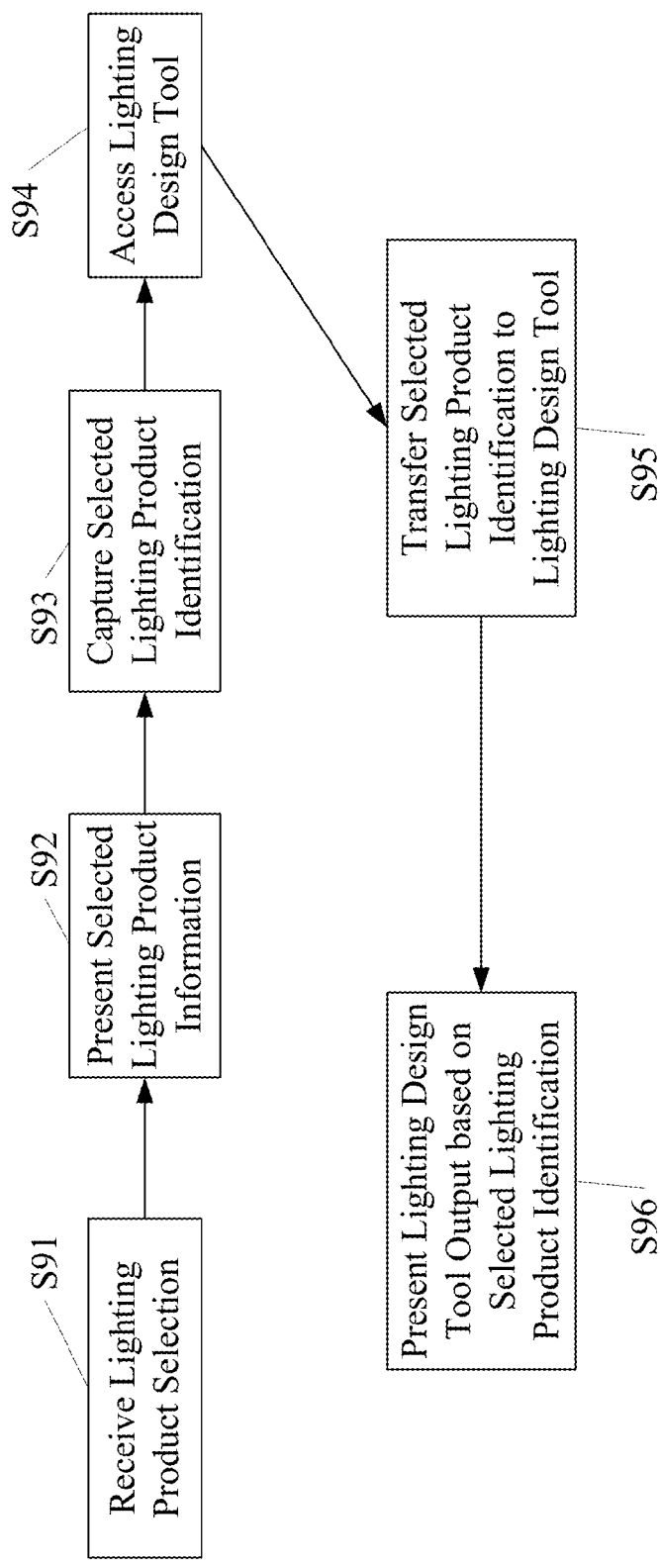
FIG. 9 is a flow chart of an example of a process to capture an identification of a selected lighting product from a lighting catalog application and transfer the identification to a lighting design tool.

FIG. 9 is a flow chart of an example of a process to capture an identification of a selected lighting product from a lighting catalog application and transfer the identification to a lighting design tool. In step S91, a lighting product selection is received. In one example, a lighting catalog, such as lighting catalog app 200, is utilized to browse listed lighting products. From the browsing, a user, such as the intended end-use customer and/or a lighting designer, selects a particular lighting product. In response to the received lighting product selection, information about the selected lighting product, in step S92, is presented. The presented information includes, for example, an image of the selected lighting product as well as detailed specifications of the selected lighting product.

In step S93, an identification of the selected lighting product is captured; and, in step S94, a lighting design tool is accessed. In one example, the identification of the selected lighting product is a serial number, a part number and/or a product identifier that uniquely identifies the selected lighting product.

The lighting design tool, for example, facilitates designing a lighting installation for a defined space. In step S95, the captured identification of the selected lighting product is transferred to the lighting design tool. By automatically transferring the captured identification to the lighting design tool, a user of the lighting design tool does not need to provide manual input to retrieve data for the selected lighting product within the lighting design tool.

In step S96, lighting design tool presents an output based on the captured identification of the selected lighting product automatically transferred to the lighting design tool. The lighting design tool provides, for example, an optimal design of a lighting installation of the selected lighting product for a particular space defined within the lighting design tool. The lighting design tool also provides, for example, photometric information related to the designed lighting installation based on the selected lighting product.

Figure 10:
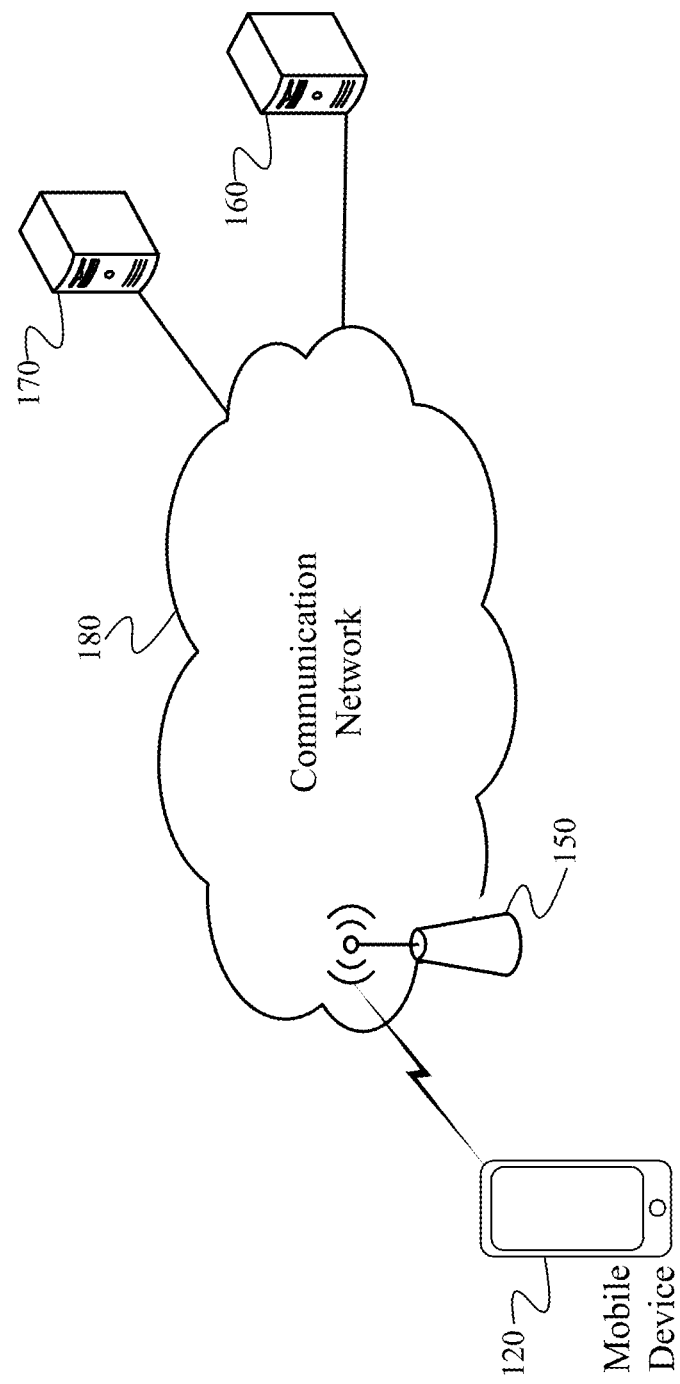
FIG. 10 illustrates an example of a mobile device accessing one or more servers via a communication network.

In the example of FIG. 10, mobile device 120 is in communication with servers 160, 170 via access point 150 and communication network 180. Communication network 180 is, for example, a private communication network, such as a local area network (LAN) and/or a wide area network (WAN) of an organization, or a public communication network, such as the Internet. Access point 150 is, for example, a Wi-Fi hotspot or a base station of a wireless mobile communication network. Servers 160, 170 are, for example, application and/or database servers. For example, server 160 is an application server implementing functionality of lighting design tool app 700 and server 170 is a database server storing information related to lighting catalog app 200. Alternatively, or in addition, either or both of servers 160, 170 may store executable code or programming implementing either or both the lighting catalog app 200 and/or lighting design tool app 700 for download and subsequent execution by mobile device 120.

Although the various examples depict selection of a single lighting product and the automatic transfer of a captured identification of the single lighting product to a lighting design tool, such depiction of the selection, capture, and transfer of a single lighting product is only for simplicity. Alternatively, or in addition, lighting catalog app 200 facilitates, for example, the selection of multiple lighting products such that the identifications of the various selected lighting products, either collectively after all of the various lighting products have been selected or repetitively for each selected lighting product, are automatically captured and automatically transferred to the lighting design tool app 700. Lighting design tool app 700 then, for example, facilitates inclusion of all of the various selected lighting products into a design of a single installation for a particular space.

As outlined above, aspects of the user interface and any associated techniques for presenting catalog information, accessing a design tool and automatically capturing an identification of a selected lighting product and transferring the captured identification to the lighting design tool may be embodied in programming of the appropriate system elements, particularly for the processor of mobile device 120. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming and/or associated data, for example, for the catalog or from the lighting design tool, may at times be communicated through the Internet or various other telecommunication networks. Such communications, for example, may enable loading of the programming and/or data from one computer or processor into another, for example, from a management server or host computer into the mobile device 120, including programming for capturing an identification of a selected lighting product and transferring the captured identification to a lighting design tool. Thus, another type of media that may bear the software/firmware program elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An article of manufacture, comprising:
  a non-transitory machine readable medium; and
  a program embodied in the medium, wherein execution of the program by a programmable device supports functions, including functions to:
    provide a graphical user interface for access to a catalog of information about lighting products listed in the catalog;
    responsive to a user selection of a lighting product from the catalog, present via the graphical user interface at least some information related to the selected lighting product and a user selectable indication of a photometric lighting design tool;
    responsive to a user selection of the indication of the photometric lighting design tool:
      automatically capture an identification of the selected lighting product;
      access the photometric lighting design tool;
      pass the identification of the selected lighting product to the photometric lighting design tool; and
      based on execution of the photometric lighting design tool responsive to the identification of the selected lighting product, present via the graphical user interface an output of the photometric lighting design tool, the output:
        including photometric performance information related to the selected lighting product within a space defined by the user; and
        being based at least in part on photometric information about the selected lighting product, at least some of the photometric information automatically retrieved by and populated to the photometric lighting design tool without further manual input to identify the selected lighting product;
    receive, via the graphical user interface, design installation parameters for a prospective installation of the selected lighting product in the space;
    pass the received design installation parameters to the photometric lighting design tool; and
    based on further execution of the photometric lighting design tool responsive to receipt of the received design installation parameters, present photometric design information resulting from photometric processing of the design installation parameters and the photometric information about the selected lighting product.

2. The article of claim 1, wherein the function to present at least some information related to the selected lighting product and the user selectable indication of the photometric lighting design tool further includes functions to:
  retrieve a visual representation of the selected lighting product; and
  present, via the graphical user interface, an overlay of the visual representation of the selected lighting product on a live image of a space while the image is being obtained by a camera of a user device implementing the graphical user interface.

3. The article of claim 2, wherein the overlay of the visual representation of the selected lighting product on the live image of the space is presented concurrently with the presentation of the user selectable indication of the photometric lighting design tool.

4. The article of claim 1, wherein the program is configured for execution on a mobile device and to present the graphical user interface to the user via one or more hardware elements of the mobile device.

5. The article of claim 4, wherein access to the catalog is via network communication between the mobile device and a server.

6. The article of claim 4, wherein execution of the photometric lighting design tool occurs on a server remote from the mobile device.

7. A method, comprising the steps of:
  receiving, via a graphical user interface of a mobile device, a user input selecting a lighting product from a catalog of information about lighting products listed in the catalog;
  presenting, via the graphical user interface of the mobile device, at least some information related to the selected lighting product and a user selectable indication of a photometric lighting design tool;
  responsive to a user input selecting the indication of the photometric lighting design tool via the graphical user interface of the mobile device:
    capturing an identification of the selected lighting product;
    accessing the photometric lighting design tool;
    passing the identification of the selected lighting product to the photometric lighting design tool; and
    presenting, via the graphical user interface of the mobile device and based on execution of the photometric lighting design tool responsive to the identification of the selected lighting product, an output of the photometric lighting design tool, the output:
      including photometric performance information related to the selected lighting product within a space defined by the user; and
      being based at least in part on photometric information about the selected lighting product, at least some of the photometric information automatically retrieved by and populated to the photometric lighting design tool without further manual input to identify the selected lighting product;
  receiving, via the graphical user interface of the mobile device, design installation parameters for a prospective installation of the selected lighting product in the space;
  passing the received design installation parameters to the photometric lighting design tool; and
  presenting, via the graphical user interface of the mobile device and based on further execution of the photometric lighting design tool responsive to receipt of the received design installation parameters, photometric design information resulting from photometric processing of the design installation parameters and the photometric information about the selected lighting product.

8. The method of claim 7, wherein the step of presenting at least some information related to the selected lighting product and the user selectable indication of the photometric lighting design tool further comprises the steps of:

retrieving a visual representation of the selected lighting product; and presenting, via the graphical user interface of the mobile device, an overlay of the visual representation of the selected lighting product on a live image of a space while the image is being obtained by a camera of a user device implementing the graphical user interface.

9. The method of claim 8, wherein presenting the overlay of the visual representation of the selected lighting product on the live image of the space is performed concurrently with presenting the user selectable indication of the photometric lighting design tool.

10. The method of claim 7, wherein the catalog is accessible via network communication between the mobile device and a server.

11. The method of claim 7, wherein execution of the photometric lighting design tool occurs on a server remote from the mobile device.

12. A system, comprising:
a processor;
a storage device accessible by the processor;
a catalog of information about lighting products listed in the catalog;
a photometric lighting design tool for designing a lighting product installation within a space and determining the photometric impact of the lighting product installation; and
a program in the storage device, wherein execution of the program by the processor configures the system to implement functions, including functions to:
provide a graphical user interface for access to the catalog;
responsive to a user selection of a lighting product from the catalog, present via the graphical user interface at least some information related to the selected lighting product and a user selectable indication of the photometric lighting design tool;
responsive to a user selection of the indication of the photometric lighting design tool:
capture an identification of the selected lighting product;
access the photometric lighting design tool;
pass the identification of the selected lighting product to the photometric lighting design tool; and
based on execution of the photometric lighting design tool responsive to the identification of the selected lighting product, present via the graphical user interface an output of the photometric lighting design tool, the output:
including photometric performance information related to the selected lighting product within a space defined by the user; and
being based at least in part on photometric information about the selected lighting product, at least some of the photometric information automatically retrieved by and populated to the photometric lighting design tool without further manual input to identify the selected lighting product;
receive, via the graphical user interface, design installation parameters for a prospective installation of the selected lighting product in the space;
pass the received design installation parameters to the photometric lighting design tool; and
based on further execution of the photometric lighting design tool responsive to receipt of the received design installation parameters, present photometric design information resulting from photometric processing of the design installation parameters and the photometric information about the selected lighting product.

13. The system of claim 12, wherein the function to present at least some information related to the selected lighting product and the user selectable indication of the photometric lighting design tool further includes functions to:
retrieve a visual representation of the selected lighting product; and
present, via the graphical user interface, an overlay of the visual representation of the selected lighting product on a live image of a space while the image is being obtained by a camera of a user device implementing the graphical user interface.

14. The system of claim 13, wherein the overlay of the visual representation of the selected lighting product on the live image of the space is presented concurrently with the presentation of the user selectable indication of the photometric lighting design tool.

15. The system of claim 12, wherein the program is configured for execution on a mobile device and to present the graphical user interface to the user via one or more hardware elements of the mobile device.

16. The system of claim 15, wherein access to the catalog is via network communication between the mobile device and a server.

17. The system of claim 15, wherein execution of the photometric lighting design tool occurs on a server remote from the mobile device.

* * * * *